Oct. 22, 1963    A. SELLMAIER    3,107,992
LOW TEMPERATURE GAS DECOMPOSITION PLANT
Filed Aug. 4, 1959
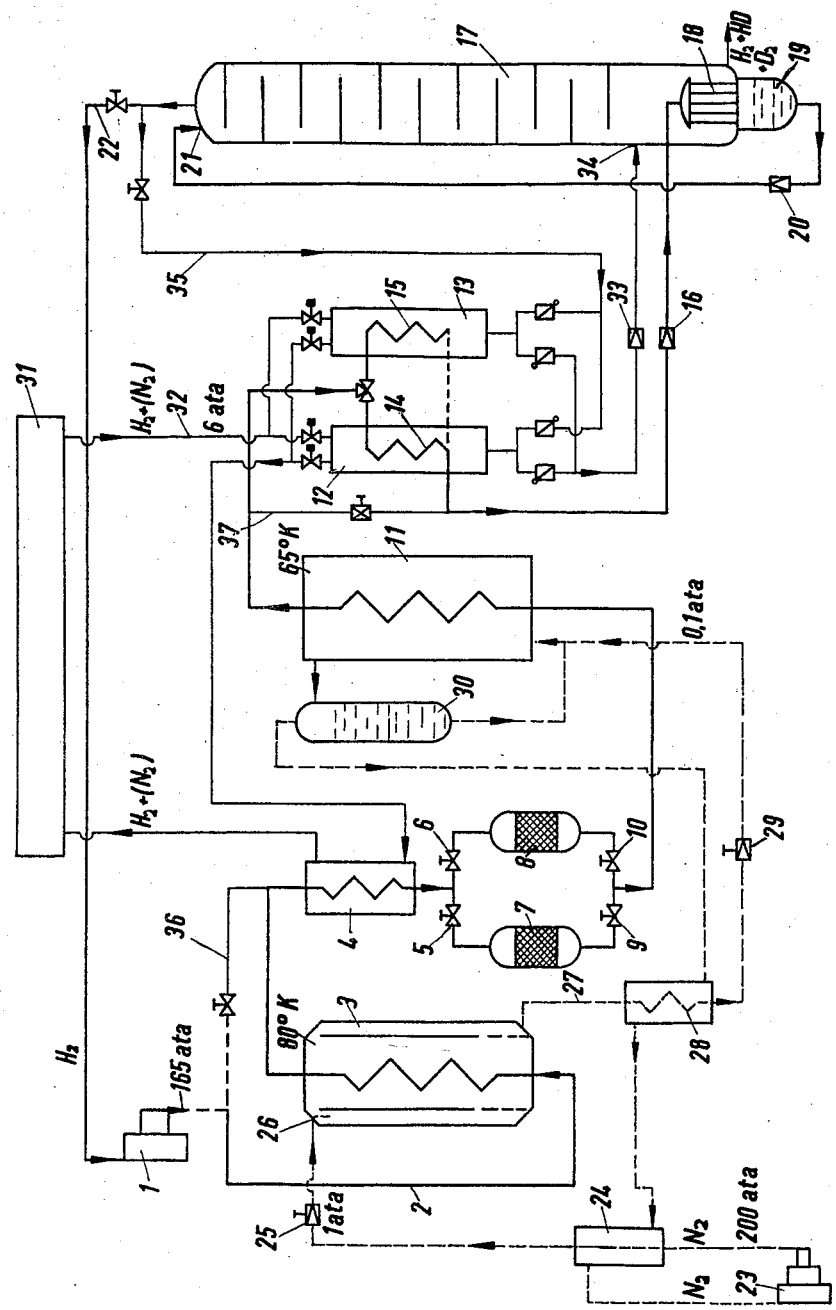
Inventor:
Alfons Sellmaier
By Pierce, Scheffler & Parker
his Attorneys

United States Patent Office 3,107,992
Patented Oct. 22, 1963

3,107,992
LOW TEMPERATURE GAS DECOMPOSITION PLANT
Alfons Sclimaier, Munich, Germany, assignor to Gesellschaft fur Linde's Eismaschinen Aktiengesellschaft, Munich, Germany, a company of Germany
Filed Aug. 4, 1959, Ser. No. 831,679
Claims priority, application Germany Aug. 6, 1958
7 Claims. (Cl. 62—18)

The invention relates to measures for purifying the refrigerating circuit in gas decomposition installations operating at very low temperatures, especially low temperature fractionating apparatus. There are conventional means for effecting the purification of a gas used for the refrigerating circuit of such installations; in particular, use is made of adsorbers, or regenerators or reversing exchangers, or both in varying combinations. The invention applies especially to a plant in which the refrigerating circuit is maintained by hydrogen or a similar low-boiling gas or mixture of gases. These conditions are found, for instance, in a plant serving for the extraction of deuterium from hydrogen by fractionation of the hydrogen.

The object of the invention is to select suitable means for maintaining the required high degree of purity in the refrigerating circuit, in particular hydrogen circuit, and to introduce them at a point in the circuit which is suitable in regard to temperature and pressure, and by means of adequate heat insulation to maintain the temperatures required for the purpose.

The usual conventional aim is at least to provide for a final purification on the pressure side of the circuit as close as possible before the entrance to the gas decomposition unit, particularly the first stage of the fractionating column. The at least partial use of adsorbers for this purpose is also a conventional method.

The investigations which led to the invention revealed that the use of adsorbers in this manner at the coldest point of a hydrogen refrigerating circuit before the gas decomposition unit is unsatisfactory because the adsorbers for purification have to be heated when switching over. However, very great refrigeration is then required to cool them down again, if the adsorbers are used at very low temperatures.

This consideration would lead to the conclusion that just before the entrance to the fractionating column it would be preferable to effect purification by condensation, for instance in regenerators, rather than by adsorption, as less cooling energy would then be required for regeneration.

Apart from the fact that purification by freezing out, i.e. by condensation, alone, even using gases which have been previously fairly well purified, especially hydrogen, would not be sufficient, there is a further consideration which is opposed to this method of purification, at least in deuterium extraction plant.

Purification by condensation and purification by adsorption both necessarily involve a relatively great surface area for fixing the components which are to be separated off. Such a large surface, be it of an adsorber, of a regenerator or of a reversing exchanger, however, at very low temperatures favors the conversion of ortho-hydrogen into para-hydrogen. This conversion of ortho-hydrogen into para-hydrogen causes an undesirable heating effect which is detrimental to the ensuing fractionation process since it causes greater expenditure of cooling energy. This conversion of ortho- into para-hydrogen is particularly favored by the low temperatures which prevail just before the entrance into the fractionating column.

In the invention, the difficulties described are eliminated and optimum energy conditions obtained in the handling of gases at the temperature of liquid hydrogen, especially for deuterium extraction, by using for purification of the refrigeration circuit consisting preferably of hydrogen, an adsorber whose operating temperature is determined by fixed points disposed before and after it, such that the operating temperaute of the adsorber is at least 20° but preferably more than 35° K. above the temperature prevailing in the base of the first fractionating stage.

In particular, in a deuterium extraction plant, the adsorber operates at a temperature of approximately 70° K.; this temperature is fixed, in accordance with an elaboration of the invention, by the interposition of a nitrogen evaporator before the adsorber and another nitrogen evaporator after the adsorber, through which the conduits to and from the adsorber lead and by means of which the vaporization temperatures of the nitrogen at approximately 1 atm. and approximately 0.1 atm., i.e. of approximately 80° K. and 65° K. are fixed.

After the hydrogen in the circuit has left the adsorber and passed through the nitrogen evaporator with the low temperature of approximately 65° K., the hydrogen, in accordance with the invention, reaches the final cooling stage which may be formed, for instance, by a regenerator unit. In this last cooling stage, an additional purification of the hydrogen by condensation of last traces of other elements can be effected. A special elaboration of the idea of the invention, however, is only for the purpose of cooling it, to conduct the hydrogen through special cooling coils running through the filling of the regenerators, the said cooling coils extending entirely or partially above the filling level in the regenerators.

It is only after this final cooling phase that the expansion or partial expansion of the circuit gas, in particular circuit hydrogen, takes place in order to produce refrigeration in the gas decomposition unit and particularly in the fractionating column.

In the case in question, the use of adsorptive purification has the advantage that a really very high degree of purity of the gas in the refrigeration circuit can be guaranteed, while on the other hand selection of the appropriate temperature before the final cooling phase and between additional fixed temperature points insures that the expenditure of cooling energy is kept within reasonable limits and ortho-para-hydrogen conversion is also restricted to the minimum possible in the circumstances.

In the drawing, one version of the refrigeration circuit purification stage in accordance with the invention is shown as an example, the single FIGURE of the drawing being a diagrammatic representation of apparatus for use in carrying out the invention.

The FIGURE of the drawing shows part of a deuterium extraction plant, in which only the structural elements and conduits necessary for the invention are represented. The refrigeration circuit is represented in the drawing by thick solid lines, while an additional nitrogen circuit is shown as a dotted line. The feed lines through which the fractionating column is fed with the hydrogen supply from which the deuterium is to be extracted are shown as thin lines.

1 is the compressor for the refrigeration circuit hydrogen, by means of which the hydrogen is compressed to about 165 atm. The refrigeration circuit hydrogen passes in a conduit 2 through a first nitrogen evaporator 3 by which the temperature is fixed at about 80° K. From there the line passes through a heat exchanger 4 and through commutator valves 5 and 6 into a pair of adsorbers 7 and 8 which are operated alternately. Through further commutator valves 9 or 10 the hydrogen passes on through a second nitrogen evaporator 11, in which a temperature of 65° K. prevails. This is followed by the last cooling stage for the circuit hydrogen, in the form of regenerators 12 and 13, for alternating use, through whose spiral pipes 14 and 15, as they alternate the hydrogen, passing through the valve 16, is fed into the fractionating column 17. After passing through the evaporator 18, the circuit hydrogen passes through the foot 19 of the whole unit and on through the expansion valve 20 into the head of the column at 21, as a reflux, where it serves as washing fluid. The gaseous hydrogen forming in the head of the column is led back, at least in part, through the conduit 22 to the compressor 1.

The fixed temperature points produced in the nitrogen evaporators 3 and 11, already mentioned, are obtained by means of the nitrogen compressed to high-pressure in the compressor 23, in this case to 200 to 250 atm., which after preliminary cooling with itself in the heat exchanger 24 is expanded to 1 atm. by means of the valve 25 and passes into the evaporator-heat exchanger 3 at 26. Through the conduit 27 the nitrogen passes on through a heat exchanger 28 to the valve 29 by means of which it is expanded to a pressure of 0.1 atm., whereupon it enters the evaporator-heat exchanger 11. This communicates with a separator 30, from the top of which the evaporating nitrogen is drawn off and conducted back through the heat exchangers 28 and 24.

Where parts of the hydrogen refrigeration circuit as well as of the nitrogen circuit are indicated by a broken line, this means that at those points the said circuits may pass through other pieces of apparatus which have no direct connection with the invention and which contain further heat exchanging or preliminary purification stages.

The hydrogen to be fractionated in the fractionating column 17, containing certain impurities, especially nitrogen, comes from an industrial gas plant 31, and after passing through a whole series of preliminary purification stages and pre-cooling stages it enters that part of the installation which concerns the invention at 32, and under a pressure of approximately 6 atm. Here it enters the regenerators 12 and 13 in which it undergoes a final purification by condensation as well as cooling, before expansion. Passing through an expansion valve 33, it is fed into the column 17 at 34. A part of the pure hydrogen given off at the top of the column 17 is diverted through the conduit 35, and flows as cooling and flushing gas through the regenerators 12 and 13 and then through the heat exchanger 4, after which it passes out of the part of the plant shown in the diagram. The purpose of the heat exchanger 4 is to modify, when necessary, the operating temperature determined by the evaporator-exchangers 3 and 11. Several by-pass lines, of which line 36 in the hydrogen refrigerating circuit is shown in the diagram, are provided for further variation of the fixed operating temperature. The temperature of the final cooling stage, which is determined by the regenerators 12 and 13, can also be regulated by the by-pass line 37.

I claim:

1. Process for the purification of the reflux circuit of a low temperature gas decomposition plant which circuit simultaneously serves as refrigeration circuit, using adsorbers which can be switched over for purifying the reflux circuit, in which process at least one adsorber unit is interposed in the reflux circuit before the final cooling stage of the gas decomposition plant and maintained at an operating temperature which is at least 20° K., preferably more than 35° K., above the temperature prevailing in the base of the first decomposition stage.

2. Process defined in claim 1, for the purification of the hydrogen reflux circuit in a hydrogen distilling plant which circuit simultaneously serves as refrigeration circuit, using adsorbers which can be switched over for purifying and reversing heat-exchanging means for cooling, in which process at least one adsorber unit is interposed before the reversing heat-exchanging means and is maintained at an operating temperature which is at least 20° K., preferably more than 35° K., above the temperature prevailing in the base of the first rectifying stage of the hydrogen distilling plant.

3. Process defined in claim 1, in which the operating temperature of the adsorber units is fixed by means of heat-exchangers interposed before these adsorber units.

4. Process defined in claim 1, in which the operating temperature of the adsorber units is fixed by means of head-exchangers interposed before and after these adsorber units.

5. Process defined in claim 4, in which the temperature of the heat-exchangers is fixed by vaporizing liquid nitrogen under different pressures.

6. Process defined in claim 1, in which the pressure of the low boiling gas of the reflux circuit in the adsorber units and the following cooling stage is the highest pressure of the circuit and is reduced by expansion just before the gas enters the decomposition stage.

7. Apparatus for the purification of the reflux circuit of a low temperature gas decomposition plant, comprising a rectifying device, a reversing heat-exchanging means, a heat-exchanger, an adsorption unit, two nitrogen evaporators for fixing the operation temperature, the first of which operates under a pressure of approximately 1 atm. and the second at a pressure of approximately 0.1 atm., means connecting the first nitrogen evaporator with the warm end of the heat-exchanger, means connecting the cold end of the heat-exchanger with the input of the adsorber unit, means connecting the output of the adsorber unit with the second nitrogen evaporator and connecting said evaporator with the warm end of the reversing heat-exchanging means, and means connecting the cold end of this reversing heat-exchanging means with the lower end of the rectifying device.

References Cited in the file of this patent

UNITED STATES PATENTS

| 2,070,099 | Twomey | Feb. 9, 1937 |
| 2,650,482 | Lobo | Sept. 1, 1953 |
| 2,954,677 | Simonet | Oct. 4, 1960 |
| 2,960,838 | Denton | Nov. 22, 1960 |

OTHER REFERENCES

"Chemical Engineering Progress," published by American Institute of Chemical Engineers, May 1954, volume 50, number 5, pages 226, 227, and 228 relied on.

Murphy: "Production of Heavy Water," published by McGraw-Hill (New York), 1955. Pages 87 to 94 relied on.